United States Patent
Ko et al.

(10) Patent No.: US 12,469,925 B2
(45) Date of Patent: Nov. 11, 2025

(54) BATTERY PACK

(71) Applicant: SK On Co., Ltd., Seoul (KR)

(72) Inventors: Jeong Woon Ko, Daejeon (KR); Bon Seok Ku, Daejeon (KR); Ja Sung Yun, Daejeon (KR); Dong Hun Lim, Daejeon (KR); Jun Hee Jung, Daejeon (KR); Sei Hoon Cho, Daejeon (KR); Ha Neul Choi, Daejeon (KR); Jae Il Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 149 days.

(21) Appl. No.: 17/673,081

(22) Filed: Feb. 16, 2022

(65) Prior Publication Data
US 2022/0263189 A1 Aug. 18, 2022

(30) Foreign Application Priority Data

Feb. 18, 2021 (KR) .................. 10-2021-0021699

(51) Int. Cl.
*H01M 50/342* (2021.01)
*H01M 50/211* (2021.01)
*H01M 50/367* (2021.01)

(52) U.S. Cl.
CPC ..... *H01M 50/3425* (2021.01); *H01M 50/211* (2021.01); *H01M 50/367* (2021.01)

(58) Field of Classification Search
CPC .......... H01M 10/052; H01M 2200/20; H01M 50/3425; H01M 50/211; H01M 50/367; Y02E 60/10
See application file for complete search history.

(56) References Cited

U.S. PATENT DOCUMENTS

| | | | |
|---|---|---|---|
| 8,875,828 B2 | 11/2014 | Rawlinson et al. | |
| 2011/0189523 A1 | 8/2011 | Eom | |
| 2012/0231306 A1 | 9/2012 | Herron et al. | |
| 2015/0064514 A1 | 3/2015 | Wu et al. | |
| 2015/0079426 A1* | 3/2015 | Chen et al. | H01M 2/12 |
| 2015/0099163 A1 | 4/2015 | Kim et al. | |
| 2015/0140369 A1* | 5/2015 | Itol et al. | H01M 2/12 |
| 2016/0218401 A1* | 7/2016 | Hermann et al. | H01M 10/42 |
| 2020/0152941 A1 | 5/2020 | Wynn et al. | |

FOREIGN PATENT DOCUMENTS

| | | | |
|---|---|---|---|
| CN | 111668409 A | 9/2020 | |
| EP | 2506336 A1 | 10/2012 | |
| EP | 3343669 A1 | 7/2018 | |
| JP | 2007027011 A * | 2/2007 | H01M 2/10 |
| JP | 2012212659 A | 11/2012 | |
| JP | 5749200 B2 | 7/2015 | |

(Continued)

OTHER PUBLICATIONS

Aoki, JP2007027011A EPO machine translation, 2007 (Year: 2007).*

*Primary Examiner* — Jonathan G Leong
*Assistant Examiner* — Kan Luo
(74) *Attorney, Agent, or Firm* — The Webb Law Firm

(57) ABSTRACT

A battery pack includes a number of secondary battery cells, and a frame unit including a number of sealed compartments in which the number of secondary battery cells are dispersedly accommodated, and configured to, when flames or gas are generated in a secondary battery cell disposed in one of the compartments, discharge the flames or gas.

15 Claims, 8 Drawing Sheets

(56) References Cited

FOREIGN PATENT DOCUMENTS

| | | | |
|---|---|---|---|
| JP | 2016534518 | A | 11/2016 |
| JP | 2018203029 | A | 12/2018 |
| KR | 1020110090468 | A | 8/2011 |
| KR | 1020150041293 | A | 4/2015 |
| KR | 101947887 | B1 | 2/2019 |

* cited by examiner

BATTERY PACK

CROSS-REFERENCE TO RELATED APPLICATION

This application claims priority to Korean Patent Application No. 10-2021-0021699 filed Feb. 18, 2021, the disclosure of which is hereby incorporated by reference in its entirety.

BACKGROUND OF THE INVENTION

1. Field of the Invention

Example embodiments of the present disclosure relate to a battery pack.

2. Description of Related Art

As technological development and demand for mobile devices, electric vehicles, or the like, have increased, demand for battery cells as an energy source has rapidly increased. A battery cell may be repeatedly charged and discharged as conversion between chemical energy and electrical energy is reversible.

Also, a plurality of battery modules including a plurality of secondary battery cells may be mounted in an electric vehicle, and may be installed as a battery pack.

Recently, when secondary battery cells are installed in an electric vehicle, a technique (cell to pack; CTP) of forming a battery pack by omitting the process of manufacturing the secondary battery cells as a battery module and installing the battery module, and directly installing the secondary battery cells in an electrical vehicle has been suggested.

However, secondary battery cells may generate heat while being charged and discharged, and one of the secondary battery cells may explode due to an increase of temperature of the secondary battery cells, or one of the secondary battery cells may explode due to an external impact.

Further, the explosion of one of the secondary battery cells may spread to the other secondary battery cells installed in a battery pack, such as a vehicle, such that the explosion may occur consecutively.

That is, thermal propagation due to the explosion of one of the secondary battery cells, flame, or high temperature, high pressure gas, or the like, may affect the other secondary battery cells installed in the battery pack of a vehicle, which may cause consecutive explosion.

Therefore, to address the above-mentioned issues or limitations, the studies on a battery pack may be necessary.

SUMMARY OF THE INVENTION

An example embodiment of the present disclosure is to provide a battery pack including secondary battery cells directly installed in a vehicle, which may address the issue in which, as one of the secondary battery cells explodes, flames or a gas may spread to other secondary battery cells in the battery pack such that the secondary battery cells may consecutively explode.

According to an example embodiment of the present disclosure, a battery pack includes a plurality of secondary battery cells, and a frame unit including a plurality of sealed compartments in which the plurality of secondary battery cells are dispersedly accommodated, and configured to, when flames or gas are generated in a secondary battery cell disposed in one of the compartments, discharge the flames or gas.

The frame unit may include a vent pipe portion configured to be, when flames or gas are generated in the secondary battery cell disposed in the compartment, connected to an internal portion of the compartment to primarily ventilate the flames or gas, and configured to be connected externally and to secondarily ventilate the flames or gas externally.

The compartment may include a lower frame on which the secondary battery cell is seated, a side frame having a lower end coupled to the lower frame and enclosing a predetermined number of the secondary battery cells together with the vent pipe portion, and an upper frame coupled to upper ends of the vent pipe portion and the side frame, and covering an upper portion of the secondary battery cell.

A thermal conductive material may be applied to an upper surface of the lower frame on which the secondary battery cell is seated, and the lower frame may directly discharge heat of the secondary battery cell externally.

The vent pipe portion may include or define a hollow, space, or cavity therein, a first connection hole connected to the internal portion of the compartment is formed on a first sidewall of the vent pipe portion opposing the compartment, and an opening adjustment portion is provided in the first connection hole to open the first connection hole when flames or gas are generated in the secondary battery cell disposed in the compartment.

The opening adjustment portion may be provided as a rupture disk configured to rupture when pressure in the compartment is higher than pressure in the vent pipe portion.

The opening adjustment portion may be provided as a one-way door opening and closing toward the vent pipe portion when pressure in the compartment is higher than pressure in the vent pipe portion.

The vent pipe portion may oppose a plurality of compartments, and a second connection hole configured to discharge the flames or gas externally may be formed on one end of the vent pipe portion.

The vent pipe portion may include a blocking plate dividing an internal hollow, space, or cavity into a plurality of partitioned regions, and the blocking plate may be provided in a portion corresponding to a boundary between compartments that are proximate, adjacent, or next to each other.

A second connection hole configured to discharge the flames or gas externally may be formed in a second sidewall of the vent pipe portion opposing an outside of the battery pack, and the second connection hole may be formed between blocking plates that are proximate, adjacent, or next to each other.

In the vent pipe portion, first connection holes may be formed in positions in the first sidewall corresponding to both ends of the compartment, respectively, and the second connection hole may be formed in a position in the second sidewall corresponding to a central portion of the compartment.

In the vent pipe portion, the first connection hole may be formed in a position in the first sidewall corresponding to a central portion of the compartment, and second connection holes may be formed in positions in the second sidewall corresponding to both ends of the compartment, respectively.

The vent pipe portion may further include a hole insulating portion disposed in at least one of the first connection hole formed to be connected to an internal portion of the compartment and/or the second connection hole formed to be connected externally.

The battery pack may further include a barrier member provided between the plurality of secondary battery cells.

BRIEF DESCRIPTION OF DRAWINGS

The above and other aspects, features, and advantages of the present disclosure will be more clearly understood from the following detailed description, taken in conjunction with the accompanying drawings, in which.

DESCRIPTION OF THE INVENTION

Figure 1:
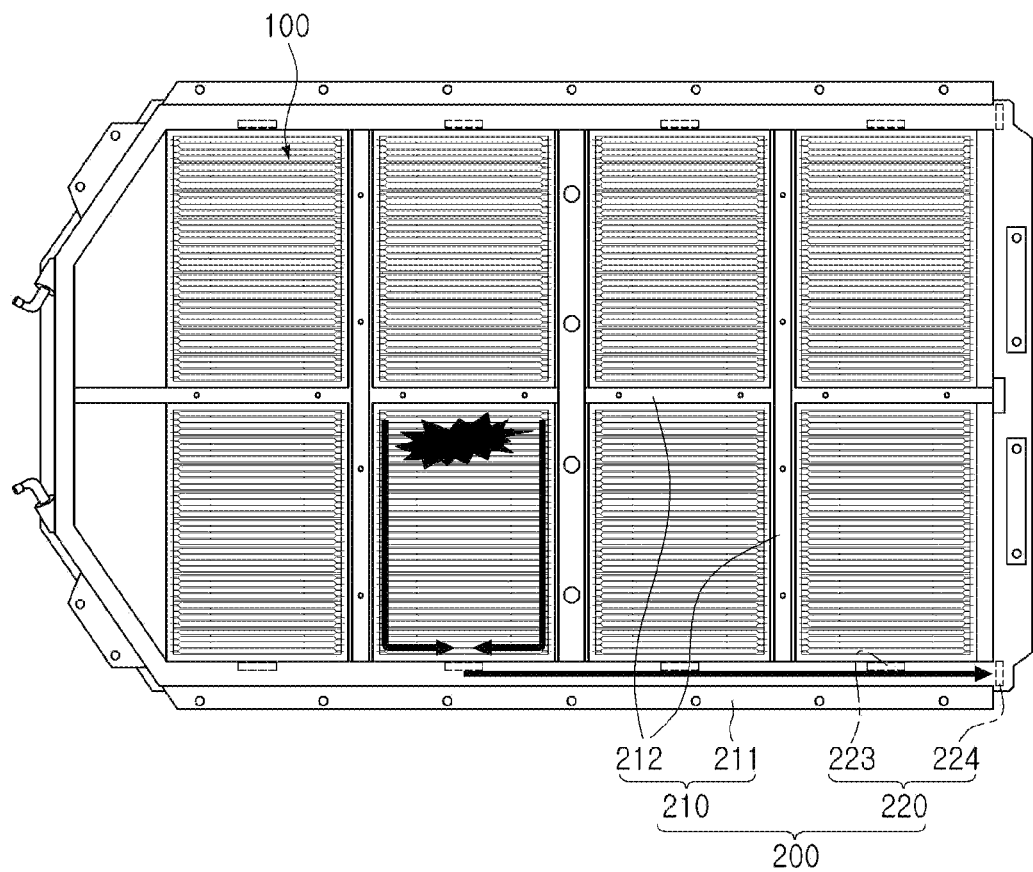
FIG. 1 is a cross-sectional plan diagram illustrating an example embodiment of a battery pack.

Hereinafter, embodiments of the present disclosure will be described below with reference to the attached drawings.

It is to be understood that the terms or words used in this description and the following claims are not to be construed to have meanings which are general or may be found in a dictionary. Therefore, considering the notion that an inventor may most properly define the concepts of the terms or words to best explain his or her invention, the terms or words must be understood as having meanings or concepts that conform to the technical spirit of the present disclosure. Also, since the example embodiments set forth herein and the configurations illustrated in the drawings are mere examples and are not representative of all technical spirits of the present disclosure, it is to be understood that various equivalents and modifications may replace the example embodiments and configurations at the time of the present application.

In the drawings, same elements will be indicated by same reference numerals. Also, redundant descriptions and detailed descriptions of known functions and elements that may unnecessarily make the gist of the present disclosure obscure will be omitted. In the accompanying drawings, some elements may be exaggerated, omitted or briefly illustrated, and the sizes of the elements do not necessarily reflect the actual sizes of these elements.

The example embodiment relates to a battery pack, and may be applied to a battery pack (cell to pack; CTP) technique in which secondary battery cells are directly installed in a vehicle. The technique may exclude components such as unnecessary battery modules, such that weight may be reduced, and thermal conduction efficiency and energy density may improve.

Further, the example embodiment may address the issue of consecutive explosion of the entire secondary battery cells in the battery pack due to flames or gas spread to the secondary battery cells caused by the explosion of one of the secondary battery cells. That is, the battery pack in the example embodiment may, during the thermal runaway in a secondary battery cell disposed in one of the compartments, avoid or prevent thermal propagation to a secondary battery cell disposed in the other compartment.

FIG. 1 is a cross-sectional plan diagram illustrating an example embodiment of a battery pack. Referring to FIG. 1, the battery pack in the example embodiment may include a plurality of secondary battery cells 100 and a frame unit 200. The frame unit 200 may include a plurality of sealed compartments 210 in which the plurality of secondary battery cells 100 are dispersedly accommodated, e.g., one group or subset of one or more secondary battery cells 100 per sealed compartment 210. In an example, when flames or gas are generated in the secondary battery cell 100 disposed in one of the compartments 210, the frame unit 200 may discharge the flames or gas externally. For example, the frame unit 200 may discharge the flames or gas in a bypassing manner.

That is, by dividing the plurality of secondary battery cells 100 in units of a predetermined number and disposing the divided secondary battery cells 100 in the sealed compartments 210, the frame unit 200 may avoid or temporarily prevent the explosion of the secondary battery cell 100 in one of the compartments 210 from affecting the secondary battery cell 100 in another compartment 210, whereupon consecutive explosion of the secondary battery cells 100 may occur.

Also, by discharging the flames or gas generated by the explosion of the secondary battery cell 100 occurring in one of the compartments 210 in a bypassing manner so as to not affect the other compartment 210, the thermal propagation of the explosion to the secondary battery cell 100 disposed in the other compartment 210 may be reduced or avoided, whereupon additional explosion may be avoided or prevented.

The plurality of secondary battery cells 100 may be accommodated by or arranged in a predetermined number of units of secondary battery cells 100 in the internal spaces of the plurality of divided compartments 210 in the frame unit 200, e.g., with one group or subset of one or more secondary battery cells 100 in each divided compartment 210.

Each secondary battery cell 100 may include an electrode assembly and a cell body member surrounding the electrode assembly.

The electrode assembly may include an electrolyte and may be accommodated in the cell body member together with the electrode assembly. The electrolyte may include an organic solvent such as ethylene carbonate (EC), propylene carbonate (PC), diethyl carbonate (DEC), ethyl methyl carbonate (EMC), or dimethyl carbonate (DMC) and a lithium salt such as $LiPF_6$ or $LiBF_4$. Further, the electrolyte may be in the form of a liquid, solid or gel.

The cell body member may be configured to protect the electrode assembly and to accommodate the electrolyte and, for example, the cell body member may be provided as a pouch-type member or a can-type member. In an example, the pouch-type member may be configured to seal and accommodate the electrode assembly on three sides including three surfaces, which may include, for example, an upper surface portion and side surface portions, which may be folded and bonded to seal the electrode assembly therein. In another example, the can-type member may seal and accommodate the electrode assembly on one surface, which may be an upper surface portion, and additional, e.g., four, surfaces including a lower surface portion and side surface portions, which may be folded and bonded to seal the electrode assembly therein.

However, the pouch-type secondary battery cells 100 and the can-type secondary battery cells 100 are merely examples of the secondary battery cells 100 that may be accommodated in the battery pack in the example embodiment, and the type of the secondary battery cell 100 included in the battery pack is not limited to the aforementioned examples, and the use of a secondary battery cell 100 sealed on multiple, e.g., four, sides is envisioned.

The frame unit 200 may include a plurality of compartments 210. The plurality of secondary battery cells 100 may be divided into a predetermined number of units that may be accommodated in the sealed internal portions of the compartment 210.

Figure 2:
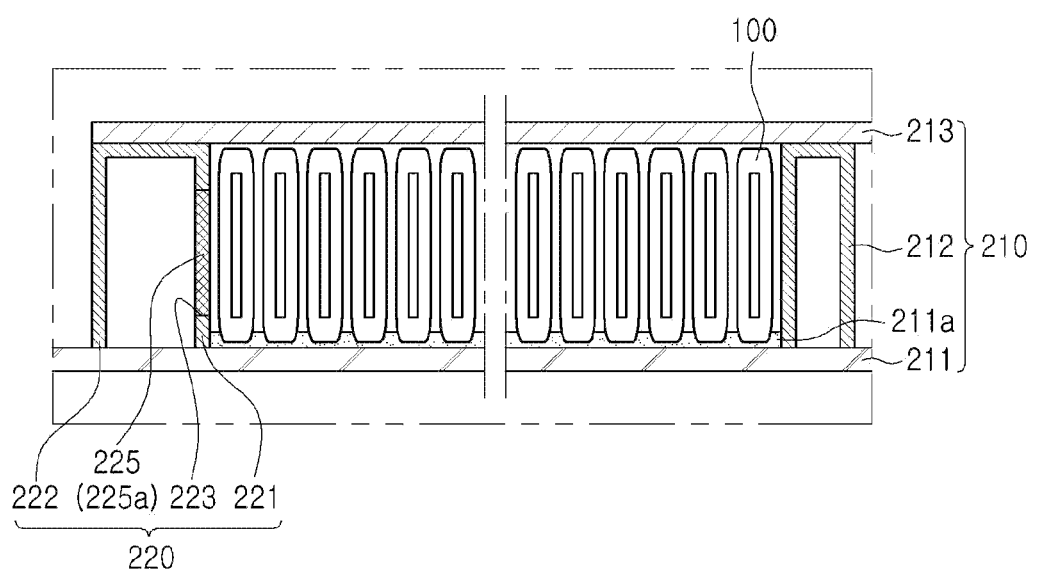
FIG. 2 is a cross-sectional diagram illustrating an example embodiment of a battery pack in which an opening adjustment portion is provided as a rupture disk in a first connection hole in a first sidewall portion of a vent pipe portion.
Figure 3:
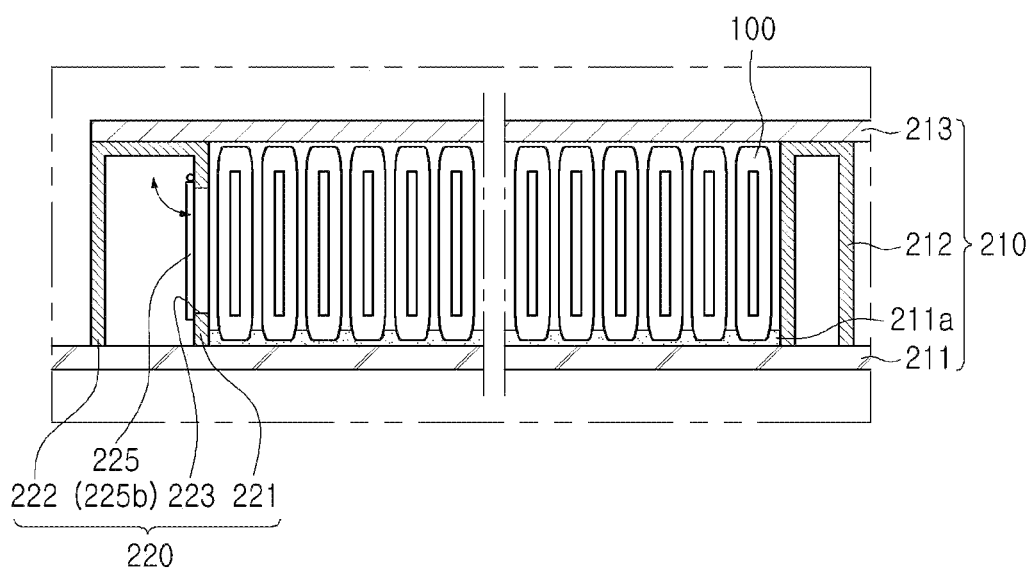
FIG. 3 is a cross-sectional diagram illustrating an example embodiment of a battery pack in which an opening adjustment portion is provided in a first connection hole as a one-way door in a first sidewall portion of a vent pipe portion.

In an example, as shown in FIGS. 2 and 3 and as will be described in greater detail hereinafter, a single compartment 210 may include a lower frame 211, a side frame 212, an upper frame 213.

In an example, when flames or gas are generated in the secondary battery cell 100 disposed in one of the compartments 210, the frame unit 200 may discharge the flames or gas in a bypassing manner such that the flames or gas are not transferred to another compartments 210. To this end, the frame unit 200 may include a vent pipe portion 220 for discharging the flames or gas.

In an example, when flames or gas are generated in the secondary battery cell 100 disposed in the compartment 210, the vent pipe portion 220 in the example embodiment may be connected to the internal portion of the compartment 210 and may primarily ventilate the flame or gas from the compartment 210, and may be connected externally to secondarily ventilate the flames or gas in the vent pipe portion 220 externally. For example, the vent pipe portion 220 may seal the internal portion of the compartment 210 by cooperating with the compartment 210.

That is, the flames or gas generated by the explosion of the secondary battery cell 100 disposed in one of the compartments 210 may be discharged externally via the vent pipe portion 220. Accordingly, the flames or gas generated in the secondary battery cell 100 arranged in one of the compartments 210 may not affect the secondary battery cell 100 arranged in another compartment 210, and consecutive explosion in the other compartment 210 may be avoided or at least temporarily prevented.

To this end, the vent pipe portion 220 of the battery pack in the example embodiment may include or define a hollow, space, or cavity therein. For example, the vent pipe portion 220 may be in the form of a pipe, channel, or conduit.

In an example, in the vent pipe portion 220, a first connection hole 223 connected to the internal portion of the compartment 210 may be formed in a first sidewall portion 221 of the vent pipe portion 220 opposing the compartment 210, and the first connection hole 223 may include an opening adjustment portion or means 225 configured to open the first connection hole 223 when flames or gas are generated in the secondary battery cell 100 disposed in the compartment 210.

For example, the vent pipe portion 220 may define one side of the internal portion or space of the compartment 210, and the internal portion of the compartment 210 may be sealed.

Also, the vent pipe portion 220 may include a first connection hole 223 connected to the internal portion of the compartment 210 to accommodate the flames or gas generated in the compartment 210. For example, the first connection hole 223 may be formed in the first sidewall portion 221 opposing the internal portion or space of the compartment 210.

Also, to seal the internal portion of the compartment 210 in a normal state, the first connection hole 223 may be closed by the opening adjustment portion or means 225. When one of the secondary battery cells 100 accommodated in the compartment 210 explodes and flames or gas are generated, the opening adjustment portion or means 225 may open the first connection hole 223. To this end, the opening adjustment portion or means 225 may include a rupture disk 225a and a one-way door 225b. A detailed description of the rupture disk 225a and the one-way door 225b will be described hereinafter with reference to FIGS. 2 and 3.

The vent pipe portion 220 of the battery pack in the example embodiment may oppose or run alongside of the plurality of compartments 210, and a second connection hole 224 for discharging the flames or gas externally may be formed on one end of the vent pipe portion 220.

In a first example embodiment, the second connection hole 224 of the vent pipe portion 220 may be formed on one end of the vent pipe portion 220 configured in the form of a pipe, channel, or conduit.

Accordingly, as the vent pipe portion 220 is in contact with the plurality of compartments 210, the first connection hole 223 connected to the internal portion of each of the compartments 210 may be in contact with each of the compartments 210, and flames or gas generated in one of the compartments 210 may be discharged through the first connection hole 223 and subsequently pass through the vent pipe portion 220 exiting the second connection hole 224 formed on one end of the vent pipe portion 220. According to the first example embodiment of the vent pipe portion 220, an additional component such as a blocking plate 226 (in FIG. 6) may not be necessary when the flames or gas are discharged in a bypassing manner, e.g., through second connection hole 224 formed on one end of the vent pipe portion 220. Also, by extending the venting path of the flames or gas, while the flames or gas are being ventilated, the temperature of the flames or gas may decrease and the flames or gas may be extinguished naturally.

FIG. 2 is a cross-sectional diagram illustrating an example embodiment of a battery pack in which the opening adjustment portion or means 225 is provided as a rupture disk 225a in a first connection hole 223 in the first sidewall portion 221 of the vent pipe portion 220. FIG. 3 is a cross-sectional diagram illustrating an example embodiment of a battery pack in which the opening adjustment portion or means 225 is provided in a first connection hole 223 as a one-way door 225b in the first sidewall portion 221 of the vent pipe portion 220.

Referring to FIGS. 1-3, in an example, the compartment 210 of the battery pack in the example embodiment may include a lower frame 211 in which the secondary battery cell 100 is seated, a side frame 212 having a lower end coupled to the lower frame 211 and enclose the predetermined number of units, groups, or subsets of the secondary battery cells 100, e.g., around the sides thereof or in a circumferential direction, along with the vent pipe portion 220, and an upper frame 213 coupled to upper ends of the vent pipe portion 220 and the side frame 212 and covering an upper portion of the secondary battery cell 100.

That is, to seal the internal space of the compartment 210, the lower frame 211, the side frame 212, and the upper frame 213 may be included.

In this example, the secondary battery cell 100 may be seated on the lower frame 211. The region of the lower frame 211 may be divided by the side frame 212 such that the secondary battery cells 100 may be isolated from each other by a predetermined number of units. That is, the lower frame 211 may be a single frame in which the entirety of plurality of secondary battery cells 100 are seated, and may be divided into a plurality of regions in which a predetermined number of the plurality of secondary battery cells 100 are accommodated.

For example, the lower frame 211 may be provided on a bottom portion below a seat area of a vehicle frame.

Also, in the lower frame 211 of the battery pack in this example embodiment, a thermal conductive material 211a may be applied to the upper surface thereof on which the secondary battery cell 100 is seated, whereupon heat generated by the secondary battery cell 100 may be directly dissipated externally.

That is, in the battery pack in this example embodiment, since the secondary battery cell 100 may be directly installed in a vehicle without an intermediate component such as a battery module, heat generated in the secondary battery cell 100 may be directly discharged through the lower frame 211 without an intermediate component and, in this case, the thermal conductive material 211a may be further included to increase thermal dissipation efficiency.

The side frame 212 may be configured to enclose a predetermined number of units of the secondary battery cell 100. To this end, the lower end of the side frame 212 may be coupled to the upper surface of the lower frame 211. Also, the side frame 212 may be disposed to divide the lower frame 211 into a plurality of regions.

For example, as shown in FIG. 1, the side frame 212 may be disposed to form a plurality of quadrangular, e.g., rectangular, regions on the upper surface of the lower frame 211.

The side frame 212 may be provided to enclose three side surfaces of the internal space of the compartment 210, and the other side surface may be enclosed by the vent pipe portion 220, e.g., by the first sidewall portion 221 of the vent pipe portion 220, such that a predetermined number of units, groups, or subsets of the secondary battery cells 100 may be entirely enclosed around the sides thereof.

The upper frame 213 may cover the upper portion of a predetermined number of units, groups, or subsets of the secondary battery cells 100, thereby sealing the internal space of the compartment 210. To this end, the upper frame 213 may be coupled to the upper end of the side frame 212 and the upper end of the vent tube 220.

Also, the opening adjustment portion or means 225 of the battery pack in the example embodiment may be provided as a rupture disk 225a configured to rupture when the pressure in the compartment 210 is higher than the pressure in the vent pipe portion 220.

That is, the rupture disk 225a may be disposed to cross the first connection hole 223 and to close or cover the first connection hole 223, and may rupture and may be opened at a predetermined pressure or more. For example, the rupture disk 225a may be formed of a material having strength which may rupture when the internal pressure of the compartment 210 is higher than the external pressure thereof. However, this example embodiment is not limited thereto, and the rupture disk 225a may be configured to have strength in which the rupture disk 225a may rupture when a difference in pressure from the external pressure is 1 atm or more or 2 atm or more.

In an example, the rupture disk 225a may be a metal plate having a thickness less than a thickness of the other portion of the first sidewall 221 of the vent pipe portion 220, or may be formed of a thin film of a material such as rubber.

Alternatively, the opening adjustment portion or means 225 of the battery pack in this example embodiment may be provided as a one-way door 225b opening and closing toward or in the hollow, space, or cavity side of the vent pipe portion 220 when the pressure in the compartment 210 is higher than the pressure in the vent pipe portion 220.

That is, the one-way door 225b may be disposed to block the first connection hole 223 to close the first connection hole 223, and may move at a predetermined pressure or more to open the first connection hole 223.

Here, the predetermined pressure may be varied, as compared to atmospheric pressure, to open and close the one-way door 225b, similarly to the rupture disk 225a described above.

Also, the one-way door 225b may be configured to move to close the first connection hole 223 and to open the first connection hole 223 in the direction of the outside of the compartment 210, i.e., in a direction of the hollow, space, or cavity side of the vent pipe portion 220.

Specifically, one end of the one-way door 225b may hinge-coupled to a portion of the first sidewall 221 proximate, adjacent, or next to the first connection hole 223, and the other end thereof may be caught, e.g., in a fraction fit manner, by the another portion of the first sidewall 221 proximate, adjacent, or next to the first connection hole 223.

Accordingly, in an example, when the one-way door 225b is pushed to move or pass the flames or gas from the internal portion of the compartment 210 externally, the first connection hole 223 may be opened. In another example, when the one-way door 225b is pushed to move or pass the flames or gas from the outside of the compartment 210 to the internal portion of the compartment 210, the one-way door 225b may be caught by the portion of the first sidewall 221 proximate, adjacent, or next to the first connection hole 223, and may close the first connection hole 223. In this way, the one-way door 225b may avoid or at least temporarily prevents flames or gas in the hollow, space, or cavity side of the vent pipe portion 220 from entering the internal portion of the compartment 210.

In an example, in the one-way door 225b, a spring member applying an elastic force in a direction of closing the first connection hole 223 may be provided on one end of the one-way door 225b hinge-coupled to the first sidewall 221.

Figure 4:
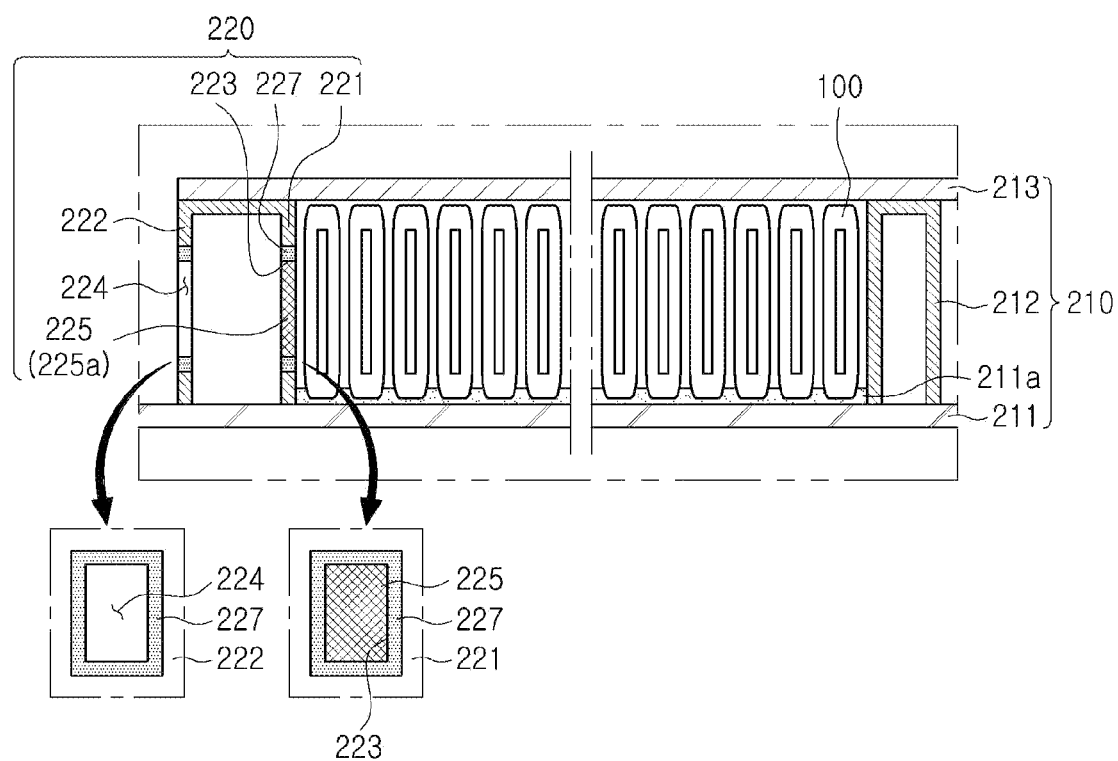
FIG. 4 is a cross-sectional diagram illustrating an example embodiment of a battery pack in which a second connection hole is formed in a second sidewall of a vent pipe portion.

FIG. 4 is a cross-sectional diagram illustrating an example embodiment of a battery pack in which a second connection hole 224 is formed in a second sidewall 222 of a vent pipe portion 220. Referring to FIG. 4, the vent pipe portion 220 of the battery pack in the example embodiment of FIG. 4 may also include a hole insulating portion 227.

The hole insulating portion 227 may be disposed in the first connection hole 223 configured to be connected to the internal portion of the compartment 210, or may be disposed in the second connection hole 224 configured to be connected externally, or may be provided along the circumference of the first and second connection holes 223 and 224.

When the hole insulating portion 227 is provided, the vent pipe portion 220 may have electrical properties due to the conductive particles generated by the explosion of the secondary battery cell 100 in one compartment 210, and accordingly, the issue in which the secondary battery cell 100 accommodated in another compartment 210 may be electrically affected may be avoided or prevented. Also, the issue in which the electric shock generated by the conductive particles affects other electronic equipment through the vent pipe portion 220, and the like, may be avoided or prevented.

Figure 5:
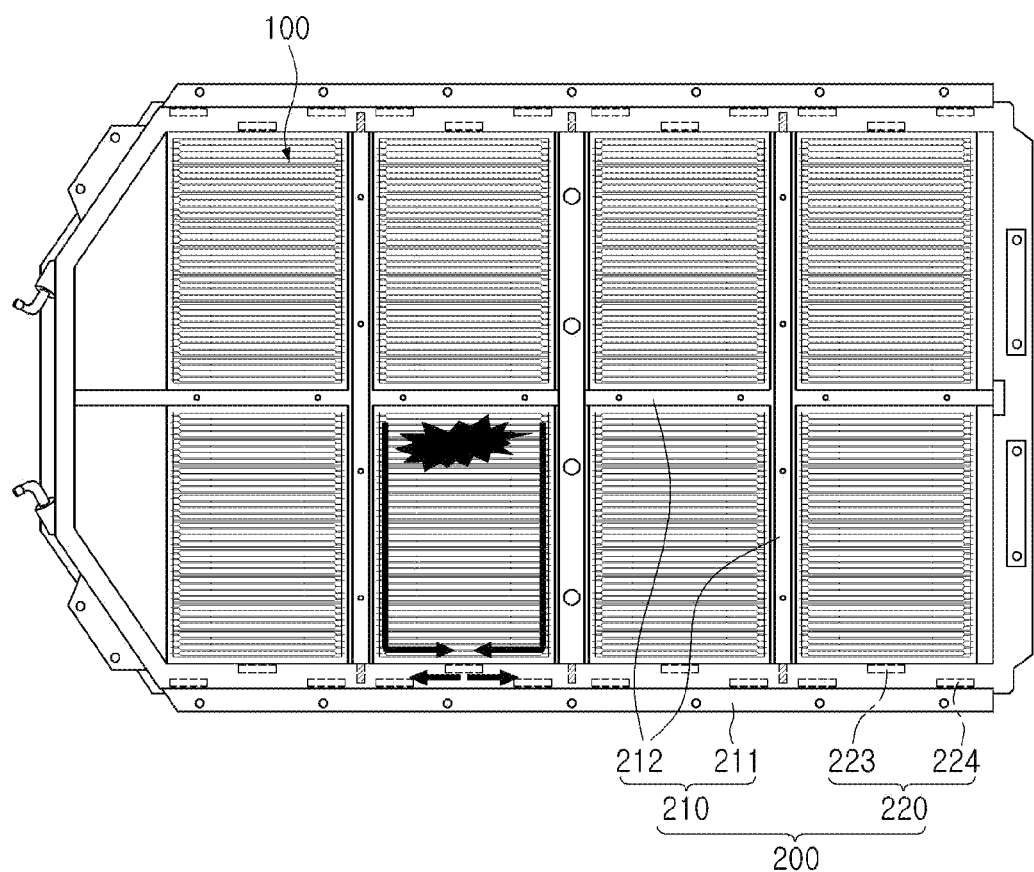
FIG. 5 is a cross-sectional plan diagram illustrating an example embodiment of a battery pack in which second connection holes are formed in positions of second sidewalls corresponding to both ends of a compartment.
Figure 6:
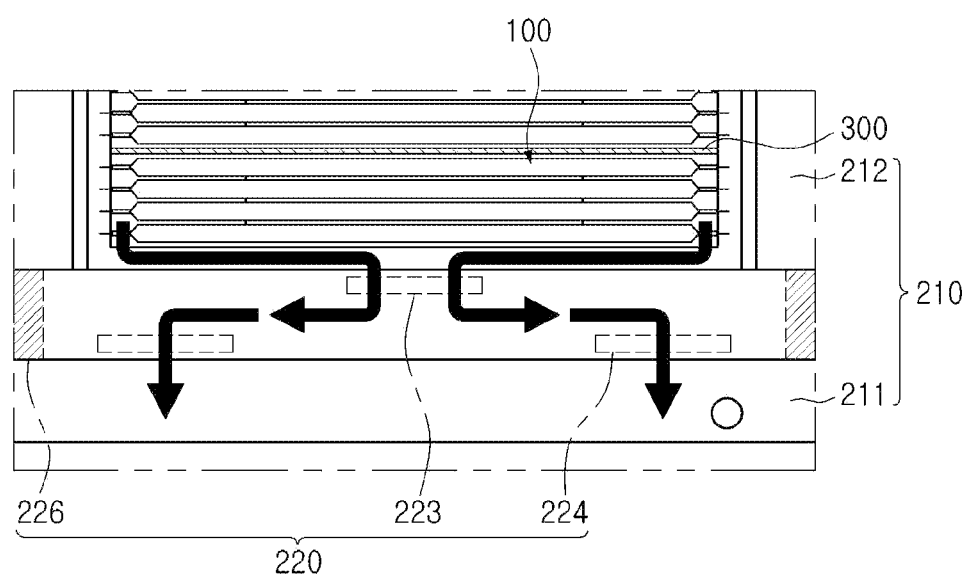
FIG. 6 is an enlarged view of a portion of the cross-sectional plan diagram of FIG. 5 illustrating a path through which flames or a gas is discharged through a first connection hole and second connection holes.

FIG. 5 is a cross-sectional plan diagram illustrating an example embodiment of a battery pack in which second connection holes 224 are formed in a second sidewall 222 of the vent pipe portion 220. FIG. 6 is an enlarged view of a portion of the plan diagram of FIG. 5 illustrating a path through which flames or a gas is discharged through a first connection hole 223 and a pair of spaced second connection holes 224.

Figure 7:
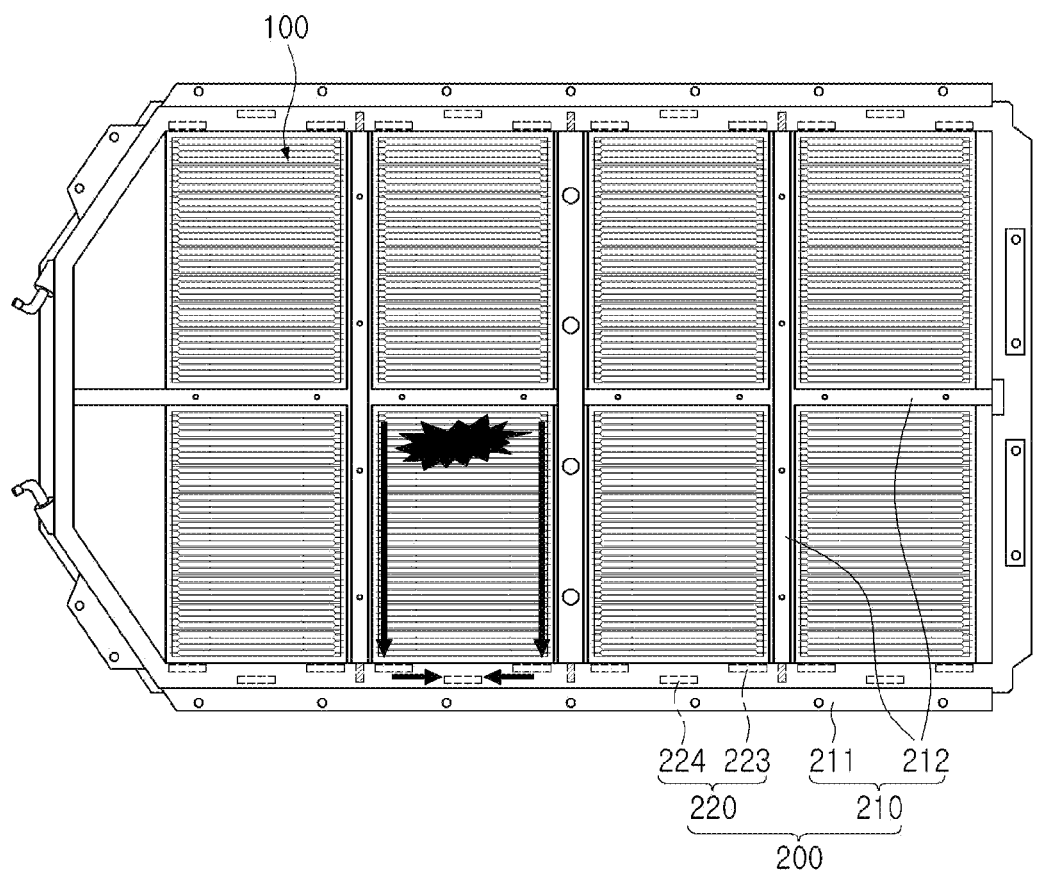
FIG. 7 is a cross-sectional plan diagram illustrating an example embodiment in which a second connection hole is disposed in a position in a second sidewall corresponding to a central portion of a compartment.
Figure 8:
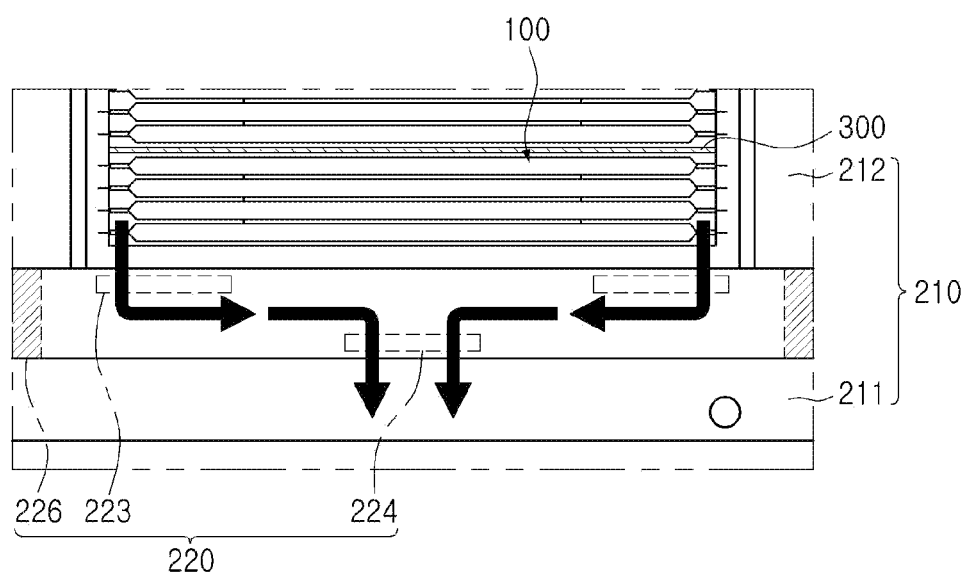
FIG. 8 is an enlarged view of a portion of the cross-sectional plan diagram of FIG. 7 illustrating a path through which flames or a gas is discharged through first connection holes and a second connection hole.

FIG. 7 is a cross-sectional plan diagram illustrating an example embodiment in which second connection holes 224 are disposed in positions in a second sidewall 222 of the vent pipe portion 220 corresponding to central portions of compartments 210. FIG. 8 is an enlarged view of a portion of the plan diagram of FIG. 7 illustrating a path through which flames or a gas is discharged through a pair of first connection holes 223 and a second connection hole 224.

Referring to the FIGS. 5 and 6, the vent pipe portion 220 of the battery pack in this example embodiment may include one or more blocking plates 226 dividing the internal hollow, space or cavity of the vent pipe portion 220 into a plurality of partitioned regions. In an example, a blocking plate 226 may be provided in a portion the internal hollow, space or cavity corresponding to the boundary between the compartments 210 proximate, adjacent, or next to each other.

That is, the blocking plate 226 may be disposed to extend from the side frame 212 and may cross the internal hollow, space or cavity of the vent pipe portion 220.

By way of the blocking plate 226, the vent pipe portion 220 may be divided into regions corresponding to the regions in which the compartments 210 are disposed, respectively, and the divided regions may be separated from each other.

The vent pipe portion 220 of the battery pack in this example embodiment may include one or more second connection holes 224 formed between the one or more blocking plates 226 for discharging the flames or gas externally in the second sidewall 222 opposing the outside.

That is, in this example embodiment, the internal hollow, space or cavity of the vent pipe portion 220 may be divided into regions by one or more blocking plates 226 and the divided regions may be isolated from each other to correspond to the compartments 210, and one or more second connection holes 224 may be formed in the portion corresponding to each of the compartments 210.

Accordingly, the flames or gas generated in each compartment 210 and entering the internal hollow, space or cavity of the vent pipe portion 220 may be discharged through the one or more second connection holes 224 formed in the portion of the vent pipe portion 220 isolated to correspond to each of the compartments 210.

Also, to extend the bypass path of the flames or gas, the first connection hole 223 and the one or more second connection holes 224 may be alternately formed in a zigzag pattern. By the extension of the venting path of the flames or gas, while the flames or gas are ventilated, the temperature of the flames or gas may decrease and the flames or gas may be extinguished naturally.

Referring to FIGS. 7 and 8, to form the first connection hole 223 and the second connection hole 224 in a zigzag pattern, in the vent pipe portion 220 of the battery pack in this example embodiment, one or more first connection holes 223 may be formed in the first sidewall 221 in a position proximate, adjacent, or next to the side frame 212 corresponding to both ends of the compartment 210, and the second connection hole 224 may be formed in the position in the second sidewall 222 corresponding to the central portion of the compartment 210.

In this case, since each first connection hole 223 is formed proximate, adjacent, or next to an electrode lead portion in which flames may be most likely be generated in the secondary battery cell 100, the flames or gas generated in the secondary battery cell 100 in one of the compartments 210 may be discharged through the shortest path in the compartment 210, i.e., the flames or gas may be swiftly discharged.

Alternatively, as shown in FIGS. 5 and 6, in the vent pipe portion 220 of the battery pack in this example embodiment, the first connection hole 223 may be formed in the position in the first sidewall 221 corresponding to the central portion of the compartment 210, and the second connection holes 224 may be formed in the positions in the sidewall 221 corresponding to both ends of the compartment 210.

In this case, since the flames generated in the compartment 210 is discharged through the single first connection hole 223 having a relatively small width, the air including oxygen from the outside may flow less into the compartment 210, which may facilitate smothering or extinguishing the flame.

Also, the battery pack in the example embodiments shown in FIGS. 6 and 8 may further include a barrier member 300 provided between the plurality of secondary battery cells 100.

The barrier member 300 may avoid or prevent at least one of heat and flame generated in one of the secondary battery cells 100 from propagating to the adjacent secondary battery cells 100. To this end, the barrier member 300 may be provided between the secondary battery cells 100 proximate, adjacent, or next to each other.

The barrier member 300 may be formed of a fireproof material such as iron (Fe), copper (Cu), aluminum (Al), for example, to avoid or prevent the propagation of heat, flame, and the like.

Alternatively, the barrier member 300 may be formed of a material including at least one of a polymer material, an inorganic material, and a ceramic material which may avoid or prevent thermal propagation so as to avoid or prevent propagation of heat and flame.

As the polymer material, for example, a silicone-based material may be used. The inorganic material may not contain carbon (C), and for example, silicon compounds such as mica, lime, salt, and glass, and a metal such as iron may be used. As the ceramic material, for example, oxide, carbide, nitride, which may be formed by combining metal elements such as silicon (Si), aluminum (Al), titanium (Ti), zirconium (Zr), or the like with oxygen, carbon, nitrogen may be used. The ceramic material may be prepared using natural raw materials such as clay, kaolin, feldspar, silica, or the like, or may be prepared using a synthetic raw material such as silicon carbide, silicon nitride, alumina, zirconia, barium titanate, or the like.

According to the aforementioned example embodiment, a battery pack including secondary battery cells directly installed in a vehicle may address the issue in which, as one of the secondary battery cells explodes, flames or a gas may spread to the other secondary battery cells in the battery pack such that the secondary battery cells may consecutively explode.

That is, the battery pack in the example embodiment may, during the thermal runaway in a secondary battery cell disposed in one of the compartments, avoid or prevent thermal propagation to a secondary battery cell disposed in the other compartment.

While the example embodiments have been illustrated and described above, it will be apparent to those skilled in the art that modifications and variations could be made without departing from the scope of the present disclosure as defined by the appended claims.

What is claimed is:

1. A battery pack, comprising:
   a plurality of cell units including a plurality of secondary battery cells; and
   a frame unit including an internal space accommodating the plurality of cell units, a side frame dividing the internal space and forming a plurality of compartments respectively accommodating at least one of the plurality of cell units, and a vent pipe portion configured to discharge flames or gas to outside of the internal space,
   wherein the vent pipe portion includes:
   a hollow space formed inside the vent pipe portion to provide a path for the flames or gas to discharge;
   a first sidewall facing the plurality of compartments and including a plurality of first connection holes communicating with the hollow space and the plurality of compartments;
   a second sidewall opposite to the first sidewall and including a plurality of second connection holes communicating with the hollow space and the outside of the internal space; and
   a blocking plate disposed to traverse the hollow space at a position corresponding to a location between adjacent plurality of compartments, dividing the hollow space into a plurality of partitioned regions that are separated from each other,
   wherein each of the plurality of compartments is in communication with a different region of the plurality of partitioned regions;
   wherein at least one of the plurality of first connection holes and at least one of the plurality of second connection holes are disposed between a plurality of blocking plates and provided in each of the partitioned regions of the hollow space; and
   wherein each of the plurality of first connection holes is disposed to overlap a respective one of the plurality of cell units.

2. The battery pack of claim 1, wherein the frame unit further comprises:
   a lower frame on which the secondary battery cell is seated; and
   an upper frame coupled to upper ends of the vent pipe portion and the side frame, and covering an upper portion of the secondary battery cell,
   wherein the side frame having a lower end coupled to the lower frame and enclosing a predetermined number of the secondary battery cells together with the vent pipe portion.

3. The battery pack of claim 2, wherein a thermal conductive material is applied to an upper surface of the lower frame on which the secondary battery cell is seated, and the lower frame directly discharges heat of the secondary battery cell externally.

4. The battery pack of claim 1, wherein the vent pipe portion comprises:
   an opening adjustment portion is provided in the first connection hole to open the first connection hole when flames or gas are generated in the secondary battery cell disposed in the compartment.

5. The battery pack of claim 4, wherein the opening adjustment portion is provided as a rupture disk configured to rupture when pressure in the compartment is higher than pressure in the vent pipe portion.

6. The battery pack of claim 4, wherein the opening adjustment portion is provided as a one-way door opening and closing toward the hollow space of the vent pipe portion when pressure in the compartment is higher than pressure in the vent pipe portion.

7. The battery pack of claim 4, wherein the vent pipe portion opposes the plurality of compartments, and the second connection hole configured to discharge the flames or gas externally is formed on one end of the vent pipe portion.

8. The battery pack of claim 1, wherein the second connection hole configured to discharge the flames or gas externally is formed in the second sidewall of the vent pipe portion, and the second connection hole is formed between blocking plates proximate, adjacent, or next to each other.

9. The battery pack of claim 1, further comprising:
   a barrier member provided between the plurality of secondary battery cells.

10. The battery pack of claim 1, wherein the vent pipe portion further comprises a hole insulating portion provided along circumferences of at least one of the first connection hole formed to be connected to an internal portion of the compartment, or the second connection hole formed to be connected externally,
    wherein the hole insulating portion is configured to reduce contact between conductive particles generated by the explosion of the plurality of secondary battery cells and the vent pipe portion.

11. The battery pack of claim 1, wherein the first connection hole and the second connection hole are provided in each of the partitioned regions of the hollow space.

12. The battery pack of claim 11, wherein the blocking member is provided in a plurality,
    wherein each of the first connection hole and the second connection hole is disposed between a plurality of blocking members.

13. The battery pack of claim 1, wherein the first connection hole formed in a position in the first side wall corresponding to a central portion of the compartment, and the second connection hole formed in a position in the second side wall corresponding both ends of the compartment.

14. The battery pack of claim 1, wherein the first connection hole formed in a position in the first side wall corresponding both ends of the compartment, and the second connection hole formed in a position in the second side wall corresponding to a central portion of the compartment.

15. The battery pack of claim 1, wherein the vent pipe portion disposed to face the plurality of compartments, extending in a first direction, and
    wherein the first connection hole and the second connection hole are spaced apart from each other in the first direction.

* * * * *